(12) United States Patent
Kotalwar

(10) Patent No.: US 9,432,280 B2
(45) Date of Patent: Aug. 30, 2016

(54) NETWORK DEVICE CONFIGURED TO GENERATE EMPTY ROUTE FOR LIMITING NUMBER OF WITHDRAWAL MESSAGES

(71) Applicant: Alcatel-Lucent USA Inc., Murray Hill, NJ (US)

(72) Inventor: Jayant Kotalwar, Cupertino, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 227 days.

(21) Appl. No.: 14/067,547

(22) Filed: Oct. 30, 2013

(65) Prior Publication Data

US 2015/0117178 A1  Apr. 30, 2015

(51) Int. Cl.
| | | |
|---|---|---|
| H04L 12/703 | (2013.01) | |
| H04L 12/761 | (2013.01) | |
| H04L 12/715 | (2013.01) | |
| H04L 12/707 | (2013.01) | |
| H04L 12/18 | (2006.01) | |

(52) U.S. Cl.
CPC .............. *H04L 45/28* (2013.01); *H04L 45/04* (2013.01); *H04L 45/16* (2013.01); *H04L 45/22* (2013.01); *H04L 12/1886* (2013.01)

(58) Field of Classification Search
None
See application file for complete search history.

(56) References Cited

U.S. PATENT DOCUMENTS

| | | |
|---|---|---|
| 7,756,072 B1 | 7/2010 | Fenner et al. |
| 7,983,261 B1 | 7/2011 | Aggarwal et al. |
| 2007/0104106 A1 | 5/2007 | Patel et al. |
| 2010/0265956 A1 | 10/2010 | Li |
| 2011/0228770 A1* | 9/2011 | Dholakia ............... H04L 45/586 370/390 |
| 2011/0255536 A1* | 10/2011 | Liu et al. ........................ 370/390 |
| 2013/0100953 A1* | 4/2013 | Li et al. ......................... 370/390 |
| 2013/0250963 A1* | 9/2013 | Zhao et al. .................... 370/400 |
| 2014/0003246 A1* | 1/2014 | Han ....................... H04L 12/185 370/236 |
| 2014/0226464 A1* | 8/2014 | Kumar ................... H04L 45/28 370/225 |

FOREIGN PATENT DOCUMENTS

| | | |
|---|---|---|
| CN | 1852236 A | 10/2006 |
| WO | PCT/US2014/061310 | 1/2015 |

OTHER PUBLICATIONS

Y. Rekhter et al., "A Border Gateway Protocol 4 (BGP-4)," Network Working Group, Request for Comments: 4271, Jan. 2006, 104 pages.

(Continued)

*Primary Examiner* — Marcus R Smith
(74) *Attorney, Agent, or Firm* — Ryan, Morgan & Lewis, LLP

(57) ABSTRACT

A first network device is configured to originate an actual route by sending a multicast join message to a particular next-hop network device, and in conjunction with originating the actual route, to generate an empty route associated with the next-hop network device for use in limiting a number of withdrawal messages that would otherwise result upon a failure in the actual route. The first network device may be further configured to generate an unreachability indicator message for the empty route indicating that the next-hop network device is unreachable responsive to the failure in the actual route, and to send the unreachability indicator message for the empty route to one or more additional network devices, with the unreachability indicator message causing each such additional network device to delete multiple actual routes to the next-hop network device that are represented by the empty route.

20 Claims, 7 Drawing Sheets

(56) References Cited

OTHER PUBLICATIONS

E. Rosen et al., "BGP/MPLS IP Virtual Private Networks (VPNs)," Network Working Group, Request for Comments: 4364, Feb. 2006, 47 pages.

J. De Clercq et al., "BGP-MPLS IP Virtual Private Network (VPN) Extension for IPv6 VPN," Network Working Group, Request for Comments: 4659, Sep. 2006, 18 pages.

E. Rosen et al., "Multicast in MPLS/BGP IP VPNs," Internet Engineering Task Force (IETF), Request for Comments: 6513, Feb. 2012, 88 pages.

R. Aggarwal et al., "BGP Encodings and Procedures for Multicast in MPLS/BGP IP VPNs," Internet Engineering Task Force (IETF), Request for Comments: 6514, Feb. 2012, 60 pages.

Juniper Networks, Inc., "NGEN MVPN BGP Route Types and Encodings, Examples for Easy Reference," www.juniper.net, Application Note, Nov. 2008, 4 pages.

Wikipedia, "Finite-State Machine," http://en.wikipedia.org/wiki/Border_Gateway_Protocol, Apr. 2013, 2 pages.

Alcatel-Lucent, "Alcatel-Lucent Data Sheet 7750 Service Router," Release 10, May 2012, 5 pages.

U.S. Appl. No. 13/859,367 filed in the name of P.G. Jain et al. on Apr. 9, 2013 and entitled "Network Device with Tunnel Establishment Control Based on Site-Type Attribute Received from Other Network Device."

B. Fenner et al., "Protocol Independent Multicast—Sparse Mode (PIM-SM): Protocol Specification (Revised)," Network Working Group, Request for Comments: 4601, Aug. 2006, 150 pages.

\* cited by examiner

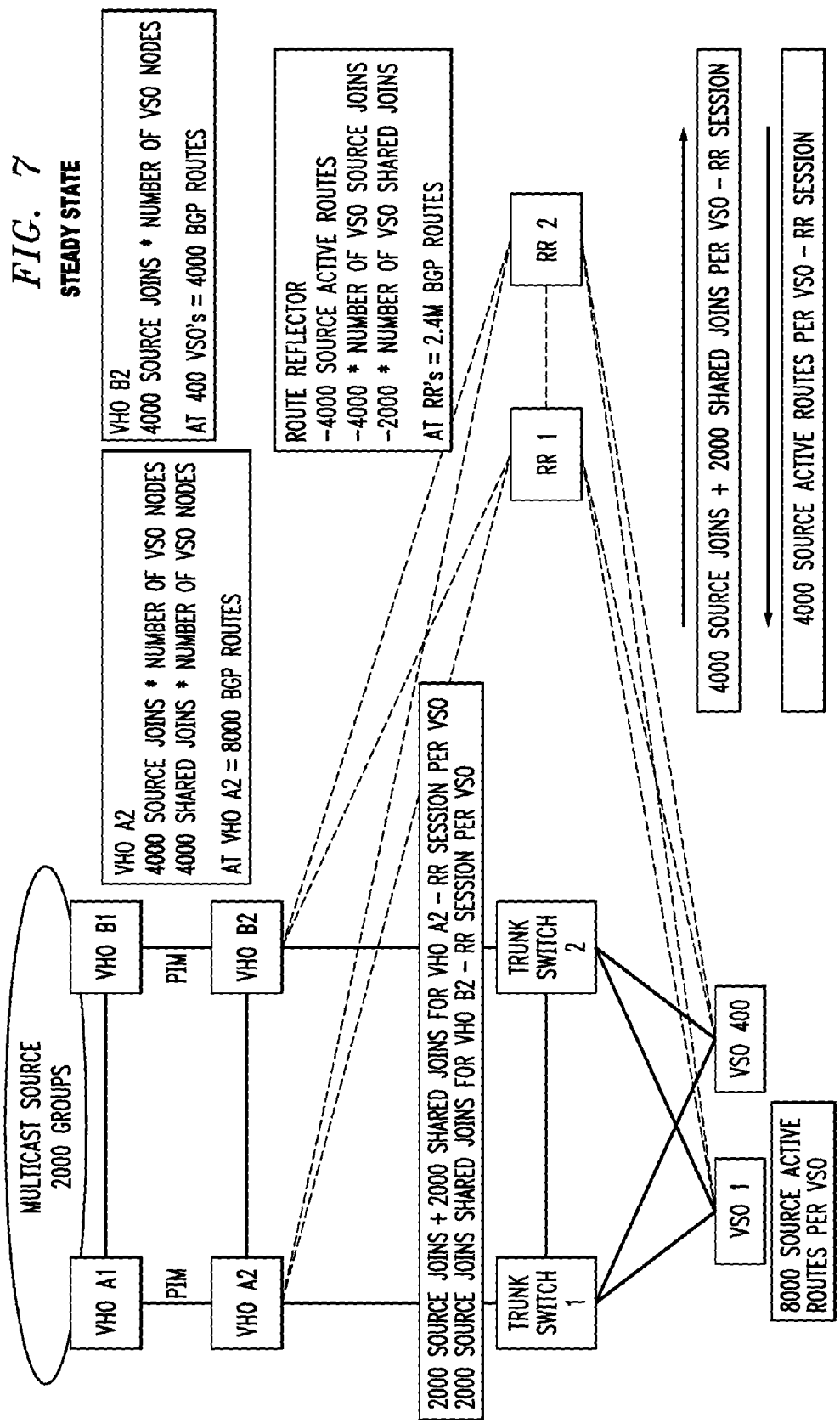

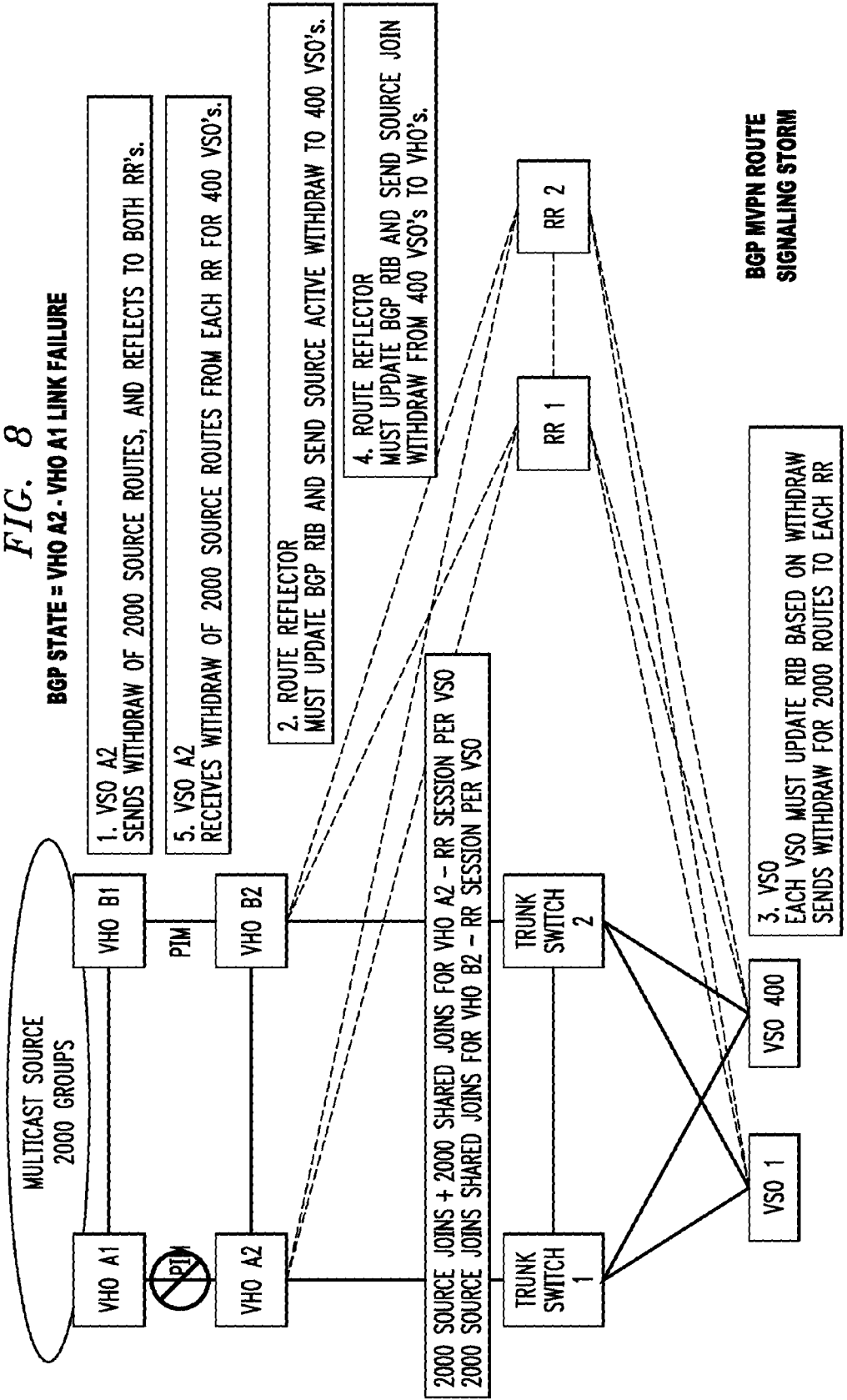

NETWORK DEVICE CONFIGURED TO GENERATE EMPTY ROUTE FOR LIMITING NUMBER OF WITHDRAWAL MESSAGES

FIELD

The field relates generally to communication networks, and more particularly to communication protocols implemented using network devices of such networks.

BACKGROUND

Communication service providers often implement Virtual Private Networks (VPNs) for their customers. For example, VPNs may be provided using Internet Protocol (IP), Border Gateway Protocol (BGP) and Multiple Protocol Label Switching (MPLS) in accordance with the techniques disclosed in Internet Engineering Task Force (IETF) Request for Comments (RFC) 4364, entitled "BGP/MPLS IP Virtual Private Networks (VPNs)," which is incorporated by reference herein. The companion standard for VPNs in IPv6 networks is RFC 4659, entitled "BGP-MPLS IP Virtual Private Network (VPN) Extension for IPv6 VPN," which is also incorporated by reference herein. IP VPN services based on RFC 4364 and RFC 4659 have been deployed extensively by service providers around the world.

VPNs configured in accordance with RFC 4364 and RFC 4659 connect customer sites via tunnels, and allow IP unicast packets to travel from one customer site to another. However, these VPNs do not provide a way for IP multicast traffic to travel from one customer site to another.

The unicast VPN services defined in RFC 4364 and RFC 4659 can be extended to include the capability of handling IP multicast traffic, using the techniques disclosed in RFC 6513, entitled "Multicast in MPLS/BGP IP VPNs," which is incorporated by reference herein. VPNs configured in accordance with RFC 6513 are considered examples of what are more generally referred to herein as multicast VPNs (MVPNs). Such MVPNs are typically configured to support the transmission of IP multicast packets between customer sites using multicast tunnels.

SUMMARY

Conventional MVPN arrangements such as those defined by RFC 6513 are problematic in that under certain circumstances a single route failure could lead to generation of excessive BGP withdrawal messages, leading to inefficient use of network resources and degraded network performance.

Illustrative embodiments of the present invention provide communication networks in which a given network device is configured to generate what is referred to herein as an "empty route." In the presence of a failure in an actual route to a next-hop network device, such as a unicast route to the next-hop network device, the empty route is utilized in a manner that permits a significant reduction in the number of BGP withdrawal messages that are generated. Such arrangements help to avoid the generation of excessive BGP withdrawal messages upon route failures in the MVPN context, thereby conserving network resources and improving network performance.

In one embodiment, a first network device is configured to originate an actual route by sending a multicast join message to a particular next-hop network device, and in conjunction with originating the actual route, to generate an empty route associated with the next-hop network device for use in limiting a number of withdrawal messages that would otherwise result upon a failure in the actual route. The multicast join message is illustratively a BGP multicast join message, although other types of multicast join messages can be used in other embodiments.

The first network device may be further configured to generate an unreachability indicator message for the empty route indicating that the next-hop network device is unreachable responsive to the failure in the actual route, and to send the unreachability indicator message for the empty route to one or more additional network devices, with the unreachability indicator message causing each such additional network device to delete multiple actual routes to the next-hop network device that are represented by the empty route.

The first and second network devices in some embodiments may comprise respective routers or other provider elements associated with an IP-MPLS network, although it is to be appreciated that numerous other types of network devices and communication networks may be used in other embodiments.

BRIEF DESCRIPTION OF THE DRAWINGS

FIGS. 5-8 illustrate withdrawal messages generated upon route failure that can be reduced in number through the use of empty routes in a video multicast network.

DETAILED DESCRIPTION

Illustrative embodiments of the invention will be described herein with reference to exemplary communication networks, network devices and associated communication protocols. It should be understood, however, that the invention is not limited to use with the particular arrangements described, but is instead more generally applicable to any communication network application in which it is desirable to provide improved performance by controlling the number of certain types of messages that are generated between network devices in response to a route failure.

Figure 1:
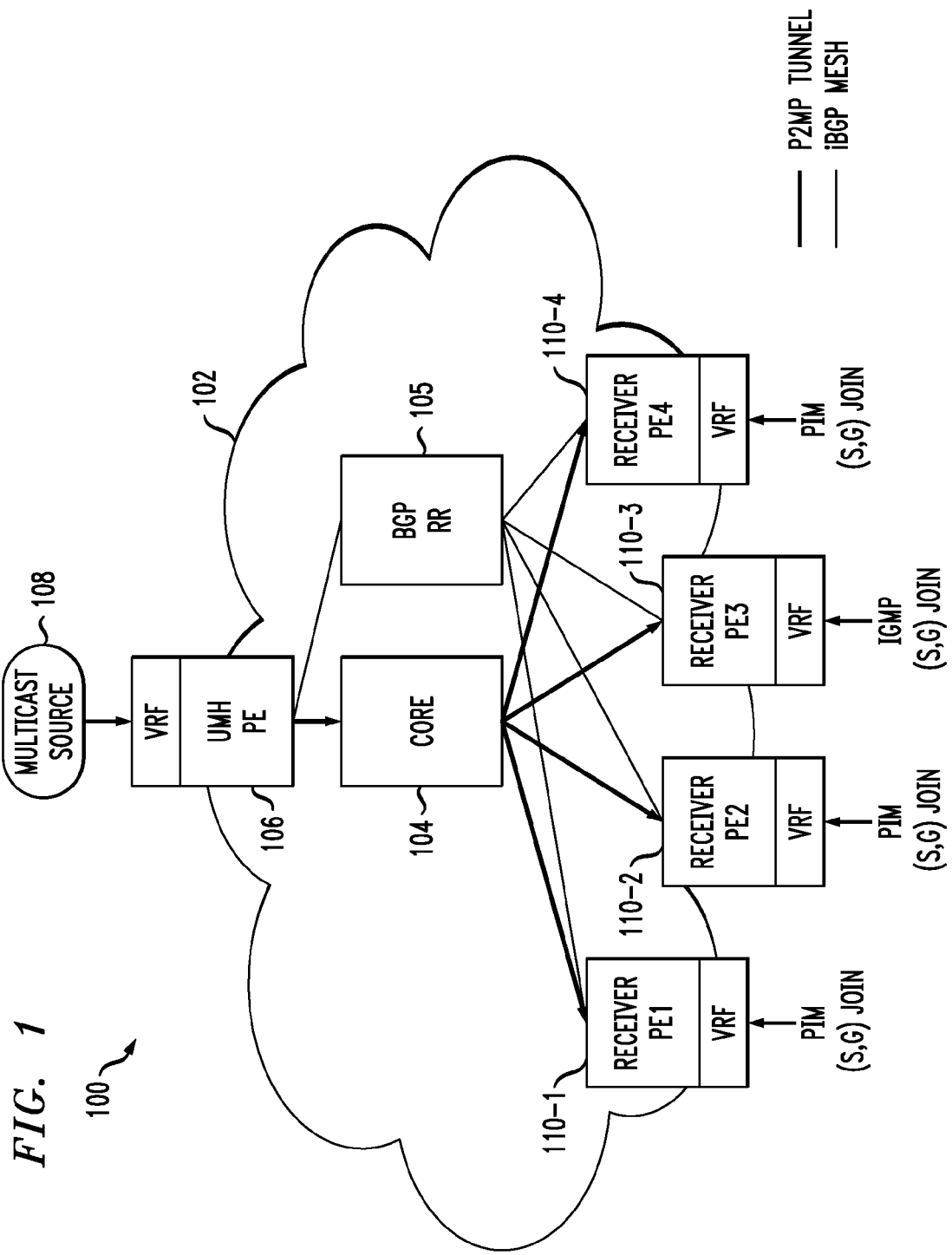
FIG. 1 shows a communication network that implements functionality for limiting a number of withdrawal messages upon route failure through the use of empty routes in an illustrative embodiment of the invention.

FIG. 1 shows a communication network 100 that includes an IP-MPLS network 102 having a core 104 and a BGP route reflector (RR) 105. The IP-MPLS network 102 includes a plurality of provider edge (PE) elements including a PE element 106 coupled to a multicast source 108 and additional PE elements 110-1, 110-2, 110-3 and 110-4. Each of the PE elements 106 and 110 represents a site of at least one MVPN and can be characterized as being one of a sender-receiver site, a sender site, and a receiver site. More particularly, in this embodiment, PE element 106 is assumed to be a sender site and PE elements 110 are assumed to be respective receiver sites of an MVPN.

These designations are examples of what are more generally referred to herein as "site types" of the PE elements. It is to be appreciated that this particular arrangement of site type designations is exemplary only, and further that the site type of a given PE element of the communication network 100 can change over time. Moreover, other embodiments may utilize additional or alternative sets of site types.

The above-cited RFC 6513 illustratively defines a given MVPN as comprising two distinct sets of sites, namely, a Sender Sites set and a Receiver Sites set, with the following properties:

1. Sites in the Sender Sites set can originate multicast traffic to sites in the Receiver Sites set.

2. Sites not in the Receiver Sites set should not be able to receive multicast traffic originated by any site that is in the Sender Sites set.

3. Sites in the Receiver Sites set can receive multicast traffic originated by any site in the Sender Sites set.

4. Sites in the Receiver Sites set should not be able to receive multicast traffic originated by any site that is not in the Sender Sites set.

A sender-receiver site is both a sender site and a receiver site, and therefore a single PE element may be in both the Sender Sites set and the Receiver Sites set.

A PE element closest to the source of a given MVPN is referred to as a root PE element of that MVPN. In the present embodiment, the root PE element of the MVPN is the PE element 106. Such a PE element may be connected directly to the source or connected via one or more network devices of one or more networks. A given tunnel carrying multicast traffic for the MVPN would originate at the root PE element.

A PE element that comprises or is associated with a receiver site of the given MVPN is referred to as a leaf PE element of that MVPN. A given tunnel carrying multicast traffic for the MVPN would terminate at a leaf PE element. The PE elements 110 are examples of leaf PE elements in the present embodiment.

Multicast tunnels established for a given MVPN make efficient use of network links by avoiding traffic replication to individual receiver sites. These tunnels are unidirectional with respect to multicast traffic. In accordance with RFC 6513, each site is generally required to establish connectivity via tunnels to respective peer sites. By way of example, tunnels that would ordinarily be established between PE pairs in accordance with RFC 6513 include P-tunnels of a Provider Multicast Service Interface (PMSI), which may comprise an Inclusive PMSI (I-PMSI) or a Selective PMSI (S-PMSI). Such tunnels are used to build a multicast tree comprising the above-noted sender and receiver PE elements as respective root and leaf PEs of the multicast tree.

BGP attributes can be advertised or otherwise transmitted by the given PE element to all other PE elements in a corresponding I-PMSI or S-PMSI auto-discovery (A-D) route. Details regarding conventional aspects of BGP and A-D routes in the context of MVPNs are disclosed in RFC 6514, entitled "BGP Encodings and Procedures for Multicast in MPLS/BGP IP VPNs," which is incorporated by reference herein.

As indicated in FIG. 1, each of the PE elements 106 and 110 maintains a Virtual Routing and Forwarding (VRF) table. A given such table contains information characterizing routes between the corresponding PE element and other PE elements that are associated with a given MVPN. The VRF tables in the FIG. 1 embodiment may be viewed as examples of what are more generally referred to herein as "routing tables." A VRF table or other routing table of a given PE element may be considered part of a routing information base (RIB) of that PE element.

The VRF tables of the respective receiver PE elements 110 are utilized in processing multicast join messages, which in the present embodiment include (S,G) join messages each configured to originate a route to a source S of a multicast group G. These messages may be configured as Protocol Independent Multicast (PIM) messages or Internet Group Management Protocol (IGMP) messages, or combinations thereof as indicated in the figure, although other protocols could also be used.

The sender PE element 106 is also denoted in the present embodiment as an upstream multicast hop (UMH) node relative to the receiver PE elements 110. The receiver PE elements 110 originate respective PIM or IGMP join messages as indicated in the figure in order to establish routes to the multicast source 108 via the sender PE element 106. The BGP RR 105 receives the join messages from the receiver PE elements and reflects them to the UMH sender PE element 106. These communications occur over an internal BGP (iBGP) mesh indicated as relatively thin interconnection lines in the figure. The BGP RR 105 serves as a peer for each of the PE elements 106 and 110, thereby avoiding the need for each of the PE elements to peer with each of the other PE elements in a full mesh arrangement. In this peering context, the BGP RR is also referred to as a route reflector server and the PE elements are referred to as respective route reflector clients.

The UMH sender PE element 106 updates its VRF table based on the join messages and sends multicast traffic received from the multicast source 108 to the receiver PE elements 110 via the multicast tree. The associated routes for the multicast traffic are illustrated in the figure as relatively thick interconnection lines illustratively denoted as point-to-multipoint (P2MP) tunnels.

It should be understood, however, that MVPNs herein are not limited to those configured in accordance with RFC 6513 or RFC 6514, and a wide variety of other MVPN arrangements can be used in embodiments of the invention.

The PE elements and multicast sources may be considered examples of respective nodes of the network 100. Numerous other types and arrangements of nodes may be used in other embodiments. Thus, for example, other types of provider elements may be used that are not necessarily PE elements. The term "node" as used herein is intended to be broadly construed, and accordingly may comprise, for example, an entire network device or one or more components of a network device.

The nodes of the communication network 100 may be fixed or mobile. Accordingly, various combinations of fixed and mobile nodes may be used in a given communication network, while other networks may comprise all fixed nodes or all mobile nodes. Each of the nodes in a given communication network may be configured in substantially the same manner, or different configurations may be used for different subsets of the nodes within a given network.

It is assumed for certain embodiments disclosed herein that each such node corresponds to a separate network device. The network devices may comprise routers, switches, computers or other processing devices, in any combination. A given network device will generally comprise a processor and a memory coupled to the processor, as well as one or more transceivers or other types of network interface circuitry which allow the network device to communicate with the other network devices. The PE elements 106 and 110 of the communication network 100 are therefore considered examples of what are more generally referred to herein as "network devices."

As mentioned previously, conventional MVPN arrangements such as those defined by RFC 6513 are problematic in that under certain circumstances a single route failure could lead to generation of excessive BGP withdrawal messages, leading to inefficient use of network resources and degraded network performance.

This problem is addressed in one or more embodiments of the present invention by configuring at least a subset of the network devices thereof to generate what is referred to herein as an "empty route" that in the presence of a failure in an actual route to a next-hop network device will significantly reduce the number of BGP withdrawal messages that are generated. Such arrangements help to avoid the generation of excessive BGP withdrawal messages upon route failures in the MVPN context, thereby conserving network resources and improving network performance.

More particularly, a given network device of the communication network 100 is assumed to be configured to originate an actual route by sending a multicast join message to a particular next-hop network device, and in conjunction with originating the actual route, to generate an empty route associated with the next-hop network device for use in limiting a number of withdrawal messages that would otherwise result upon a failure in the actual route. The given network device may be further configured to generate an unreachability indicator message for the empty route indicating that the next-hop network device is unreachable responsive to the failure in the actual route, and to send the unreachability indicator message for the empty route to one or more additional network devices, with the unreachability indicator message causing each such additional network device to delete multiple actual routes to the next-hop network device that are represented by the empty route. Such an arrangement serves to significantly reduce the number of BGP withdrawal messages that are generated responsive to route failures in the network.

This withdrawal message control functionality of communication network 100 will now be described in greater detail with reference to FIGS. 2 through 4.

Figure 2:
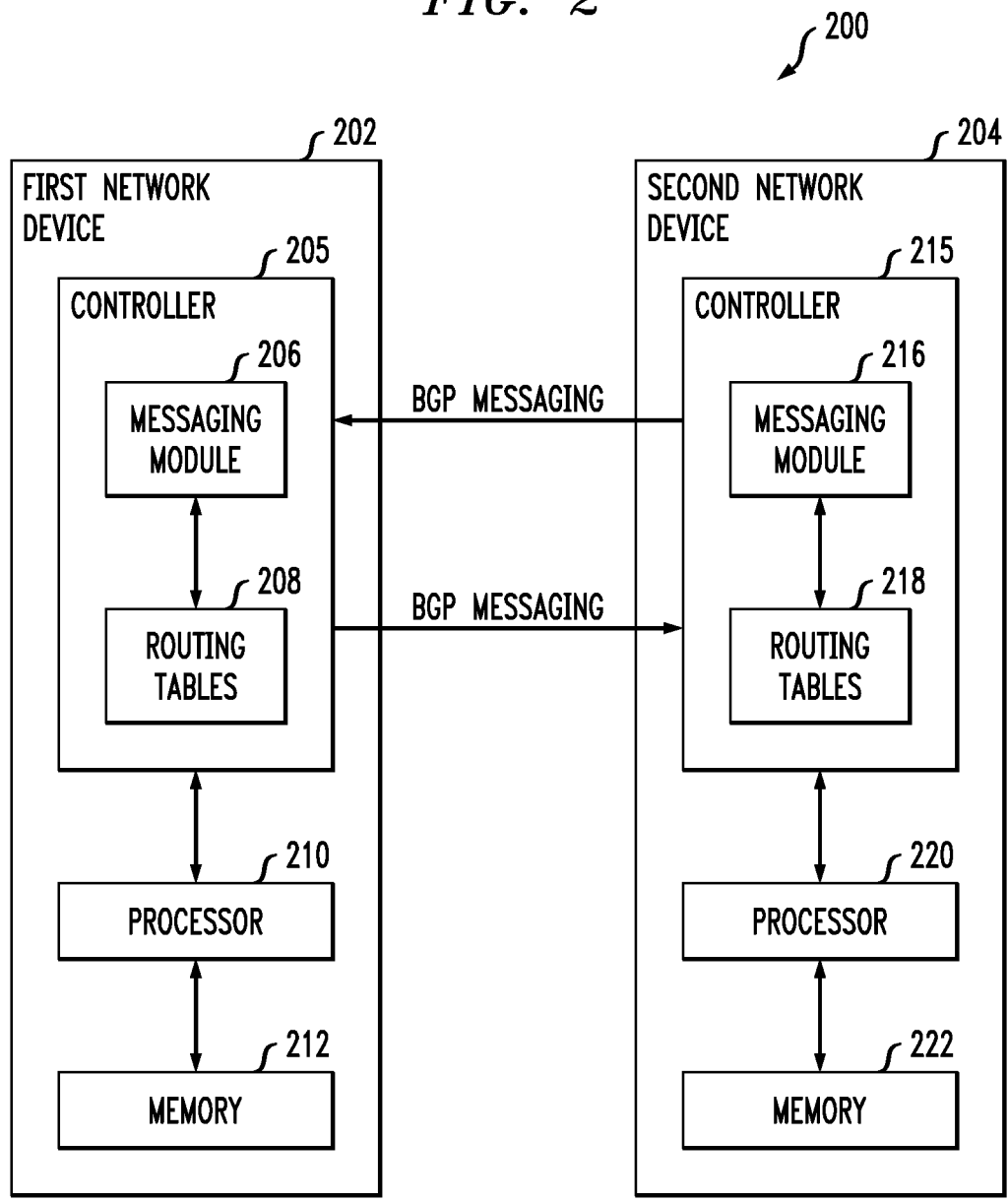
FIG. 2 is a more detailed view of first and second network devices in one possible implementation of the FIG. 1 network.

Referring initially to FIG. 2, a portion 200 of the network 100 includes first and second network devices 202 and 204 at least one of which is assumed to correspond to one of the receiver PE elements 110 of FIG. 1.

In the FIG. 2 embodiment, the first network device 202 is adapted for communication with the second network device 204, and vice versa. The first network device 202 comprises a controller 205 that includes a messaging module 206 coupled to routing tables 208. The first network device 202 further comprises a processor 210 coupled to the controller 205 and to a memory 212. The second network device 204 comprises a controller 215 that includes a messaging module 216 coupled to routing tables 218. The second network device 204 further comprises a processor 220 coupled to the controller 215 and to a memory 222.

Also in the FIG. 2 embodiment, BGP messages are exchanged between the controllers 205 and 215 utilizing the messaging modules 206 and 216. These elements are assumed to implement MVPN functionality similar to that described in the above-cited RFC 6513 and 6514, but suitably modified to support functionality for limiting withdrawal message generation through origination of empty routes.

It is to be appreciated that the particular arrangement of network device components shown in FIG. 2 is exemplary only, and numerous alternative network device configurations may be used in other embodiments. For example, the network devices can be configured to incorporate support for numerous other types of messaging in accordance with other communication protocols.

Figure 3:
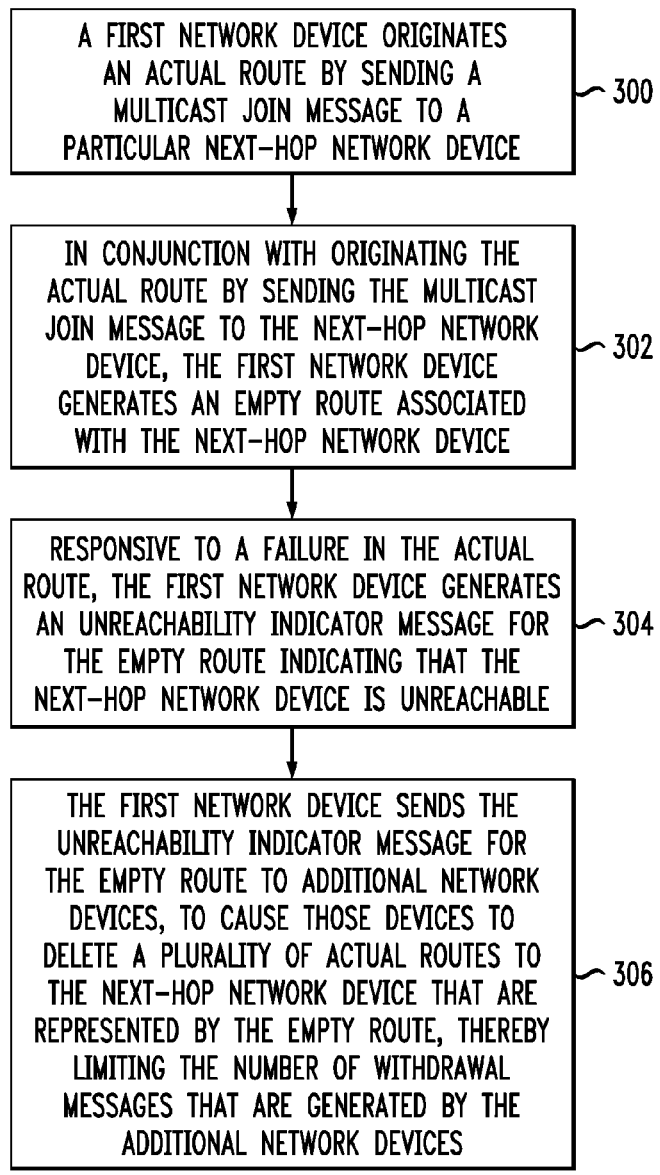
FIG. 3 is a flow diagram of an exemplary process carried out using the first and second network devices of FIG. 2.

An exemplary withdrawal message control process involving first and second network devices 202 and 204 is illustrated in the flow diagram of FIG. 3, which includes steps 300 through 306 that are assumed to be performed by the first network device 202 interacting with the second network device 204. The first network device 202 in this embodiment may correspond, for example, to a particular one of the receiver PE elements 110-1 through 110-4 of FIG. 1.

In step 300, the first network device 202 originates an actual route by sending a multicast join message to a particular next-hop network device. For example, the first network device if corresponding to one of the receiver PE elements 110 of FIG. 1 originates an actual route to a next-hop network device corresponding to the sender PE element 106 by sending a PIM or IGMP multicast join message to the sender PE element 106 via the BGP RR 105 as previously described.

The multicast join message may therefore comprise an (S,G) join message used to originate a first type of route. Other types of join messages may be used to originate other types of routes. For example, a (*,G) join message may be used to originate a second type of route, where * denotes an unspecified multicast source. The first and second types of routes in the foregoing examples may comprise respective Type 6 and Type 7 PIM routes, although other types of routes can be used.

In step 302, in conjunction with originating the actual route by sending the multicast join message to the next-hop network device, the first network device 202 generates an empty route associated with the next-hop network device for use in limiting a number of withdrawal messages that would otherwise result upon a failure in the actual route. By way of example, the empty route in some embodiments is identified by a corresponding route distinguisher (RD) of the next-hop network device, which as indicated above illustratively corresponds to the sender PE 106.

The empty route is assumed to represent a plurality of actual routes to the next-hop network device, and in the present embodiment more particularly comprises an RD Join All route that represents a plurality of actual routes to the next-hop network device. By way of example, the RD Join All route may be implemented as a PIM Type 6 route that represents all Type 6 and Type 7 routes to the next-hop network device.

These Type 6 and Type 7 routes each include the RD of the next-hop network device, and the empty route also includes the RD of the next-hop network device. Accordingly, the RD is the common factor between the empty route and the Type 6 and Type 7 routes to the next-hop network device, and serves to bind the empty route to the Type 6 and Type 7 routes to the next-hop network device.

The empty route may be specified, for example, by network layer reachability information (NLRI) that does not incorporate any actual (S,G) or (*,G) join or prune information, but instead utilizes the RD of the empty route.

Figure 4:
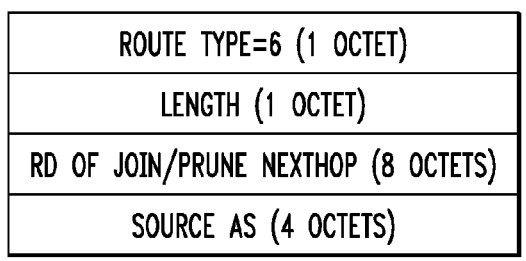
FIG. 4 shows one possible configuration of network layer reachability information for an empty route utilized by one or more of the network devices of FIG. 2.

An example of such an arrangement is shown in FIG. 4, where the NLRI for the empty route to the next-hop network device illustratively comprises a route type, a length, an RD and a source autonomous system (AS). The route type, length, RD and source AS are shown as having lengths of 1 octet, 1 octet, 8 octets and 4 octets, respectively, although other fields and field lengths can be used in other embodiments. The route type in this example is more particularly indicated as a PIM Type 6 route.

In step 304, responsive to a failure in the actual route, the first network device 202 generates an unreachability indicator message for the empty route indicating that the next-hop network device is unreachable. In addition, in conjunction with generation of the unreachability indicator message for the empty route, the first network device 202 deletes the plurality of actual routes to the next-hop network device that are represented by the empty route. The unreachability indicator message is an example of what is more generally referred to herein as a "withdrawal message."

In step 306, the first network device 202 sends the unreachability indicator message for the empty route to additional network devices so as to cause each of those additional network devices to delete the plurality of actual routes to the next-hop network device that are represented by the empty route. The actual routes that are deleted by the additional network devices in response to receipt of the unreachability indicator message for the empty route include all routes having the same route distinguisher as the empty route in respective RIBs comprising respective sets of one or more routing tables of the additional network devices. As indicated above, these routes illustratively include the Type 6 and Type 7 routes to the next-hop network device, all of which include the same RD as the empty route. This advantageously limits the number of withdrawal messages that would otherwise be generated by the additional network devices responsive to the failure.

Accordingly, in the FIG. 3 embodiment, receipt of the unreachability indicator message for the empty route by a given one of the additional network devices prevents generation of withdrawal messages by the given additional network device for routes having the same route distinguisher as the empty route.

The particular process steps and other operations described above in conjunction with the flow diagram of FIG. 3 are exemplary only, and additional or alternative process steps or operations may be used in other embodiments.

Referring again to FIG. 2, each of the network devices 202 and 204 comprises processor 210 or 220 and memory 212 or 222. The processor 210 or 220 of such a network device may be implemented utilizing a microprocessor, a microcontroller, an application-specific integrated circuit (ASIC), a field-programmable gate array (FPGA), or other type of processing circuitry, as well as portions or combinations of such processing circuitry. The processor may include one or more embedded memories as internal memories.

The processor 210 or 220 and any associated internal or external memory may be used in storage and execution of one or more software programs for controlling the operation of the corresponding network device 202 or 204. Accordingly, one or more of the modules 206 and 208 of controller 205 in network device 202, one or more of the modules 216 and 218 of controller 215 in network device 204, or portions of these modules, may be implemented at least in part using such software programs.

Each of the memories 212 and 222 of the network devices 202 and 204 is assumed to include one or more storage areas that may be utilized for program code storage. The memory 212 or 222 may therefore be viewed as an example of what is more generally referred to herein as a computer program product or still more generally as a computer-readable storage medium that has executable program code embodied therein. Other examples of computer-readable storage media may include disks or other types of magnetic or optical media, in any combination. Articles of manufacture comprising such computer program products or other computer-readable storage media are considered embodiments of the invention.

The memory 212 or 222 may more particularly comprise, for example, an electronic random access memory (RAM) such as static RAM (SRAM), dynamic RAM (DRAM) or other types of volatile or non-volatile electronic memory. The latter may include, for example, non-volatile memories such as flash memory, magnetic RAM (MRAM), phase-change RAM (PC-RAM) or ferroelectric RAM (FRAM). The term "memory" as used herein is intended to be broadly construed, and may additionally or alternatively encompass, for example, a read-only memory (ROM), a disk-based memory, or other type of storage device, as well as portions or combinations of such devices.

The processor, memory, controller and other components of a given network device of wireless network 100 may include well-known circuitry suitably modified to implement at least a portion of the withdrawal message control functionality described above. Conventional aspects of such circuitry are well known to those skilled in the art and therefore will not be described in detail herein.

It is to be appreciated that the particular arrangement of network device components shown in FIG. 2 is exemplary only, and numerous alternative network device configurations may be used in other embodiments. For example, the network devices can be configured to incorporate additional or alternative components and to support other communication protocols.

Another embodiment will now be described in more detail in conjunction with FIGS. 5-8, which illustrate reduction in a number of withdrawal messages upon route failure through the use of empty routes in a video multicast network. In this embodiment, the first network device is assumed to correspond to a particular one of a plurality of video serving offices (VSOs) that each communicate with one or more video hub offices (VHOs) and one or more associated route reflectors (RRs).

Figure 5:
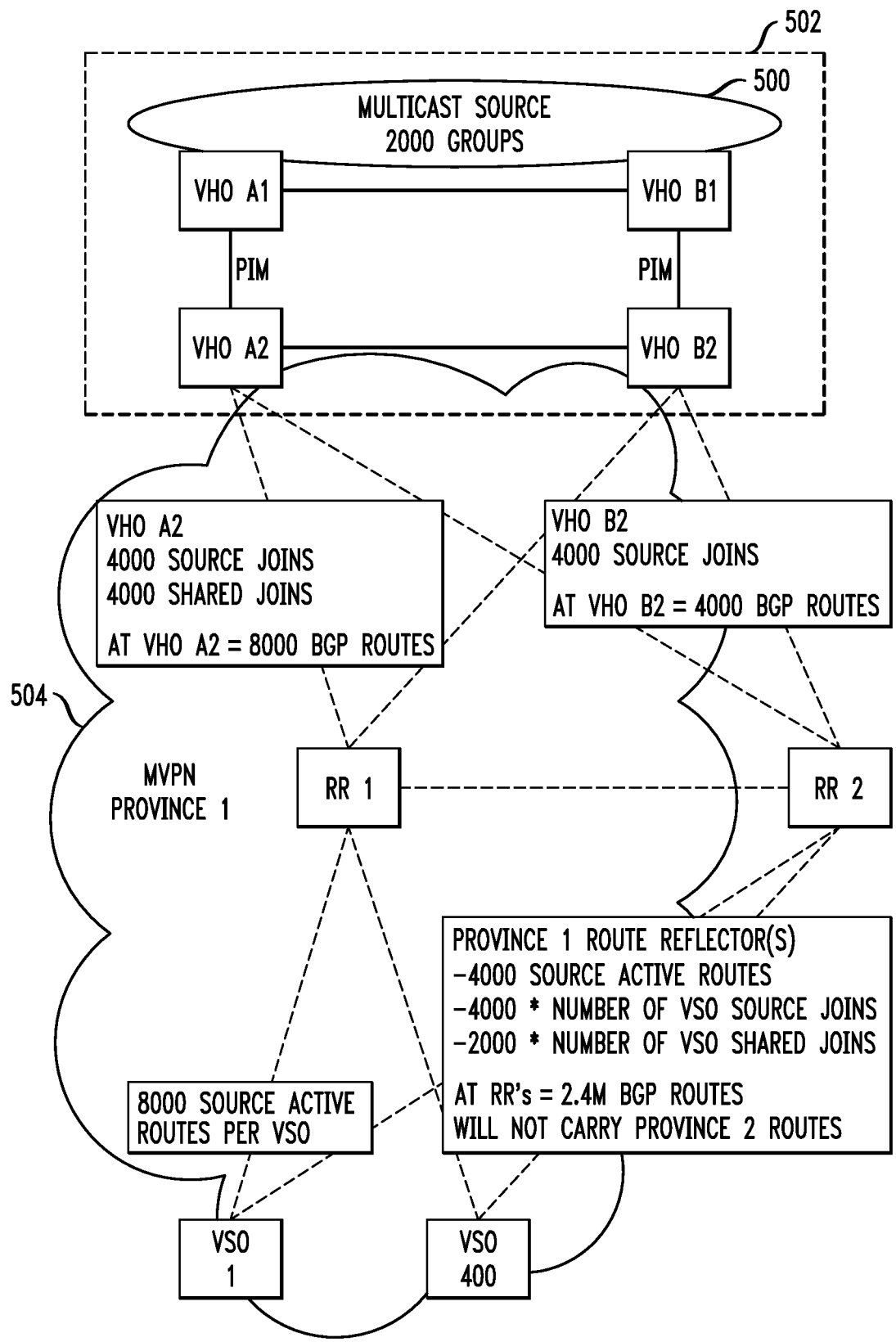

Referring initially to FIG. 5, a multicast source 500 of a video multicast system head end 502 in this embodiment is assumed to stream a total of 2000 video channels, each corresponding to a different one of 2000 multicast groups. There are 400 VSOs corresponding to respective receiver sites receiving the multicast channels via the VHOs.

The multicast source 500 is coupled to VHOs denoted VHO A1 and VHO B1, respectively. The VHOs communicate using PIM messaging with respective VHOs denoted VHO A2 and VHO B2. The VHOs in this embodiment are assumed to comprise respective routers, although other types of network devices may be used. As a more particular example, at least a subset of the VHOs may comprise respective Service Routers (SRs) of a type commercially available from Alcatel-Lucent under Product No. 7750, although again other types and arrangements of routers, or more generally network devices, can be used in other embodiments.

The routers VHO A2 and VHO B2 are coupled to an MVPN province 504 denoted as Province 1. This province includes the above-noted 400 VSOs denoted as VSO 1 through VSO 400. There are 8000 Source Active routes per VSO.

The route reflector within Province 1 is more particularly denoted as RR 1, and is configured to interact with one or more additional route reflectors, including another route reflector denoted RR 2. The route reflector RR 2 is assumed to be associated with another province denoted Province 2 but not explicitly shown in the figure.

It is assumed that each VSO joins each of the 2000 available multicast channels. This involves sending 2000 (*,G) join messages, also referred to herein as "shared joins." Each VSO also sends additional (S,G) join messages, also referred to herein as "source joins." Shared joins and source joins in the present embodiment are associated with Type 6 and Type 7 routes, respectively. In order to achieve full redundancy for the corresponding (S,G) traffic, each VSO more particularly joins two tunnels, namely, a tunnel with VHO A2 and a tunnel with VHO B2. Each VSO therefore sends two source joins per multicast channel, such that in total it sends 4000 source joins. VHO A2 handles 4000 source joins and 4000 shared joins corresponding to 8000 BGP routes. VHO B2 handles 4000 source joins corresponding to 4000 BGP routes.

On receiving the (S,G) join messages, the VHOs A2 and B2 originate corresponding Type 5 Source Active routes. Each VSO is assumed to receive these routes from both RR 1 and RR 2 resulting in 8000 Source Active routes per VSO.

Assuming that it does not carry any Province 2 routes, the Province 1 route reflector RR 1 will carry on the order of 2.4 million BGP routes in this example, given approximately by (4000*(Number of VSOs=400))+(2000*(Number of VSOs=400))=1.6M+0.8M=2.4M BGP routes.

Figure 6:
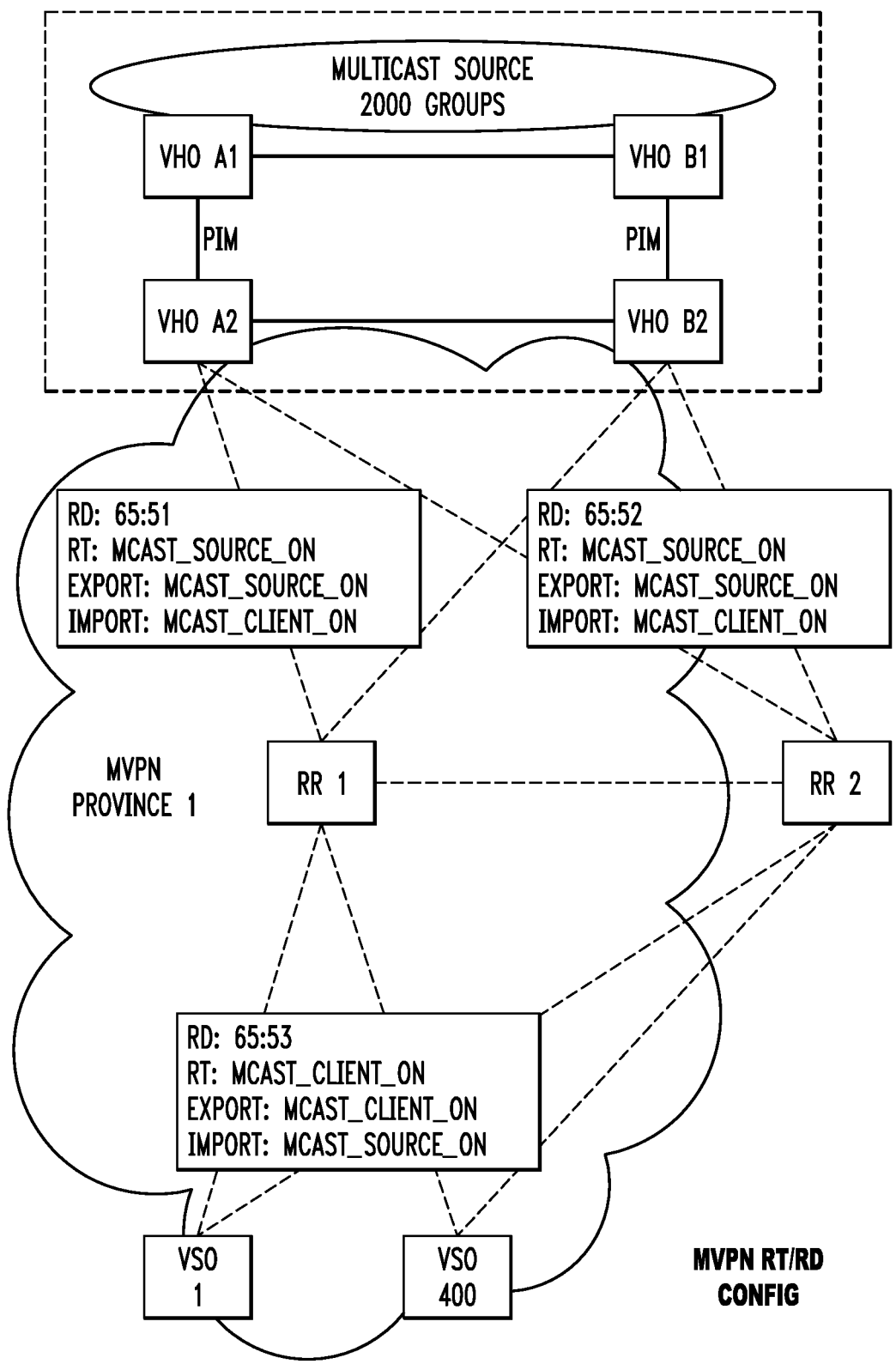

The corresponding MVPN configuration for the present embodiment, including exemplary RDs as well as associated RT, export and import information, is shown in FIG. 6. The resulting steady state configuration is illustrated in FIG. 7. FIG. 7 also shows some additional exemplary interconnection detail between the VHOs and the VSOs, including first and second trunk switches denoted as Trunk Switch 1 and Trunk Switch 2.

This exemplary configuration can lead to excessive BGP withdrawal messaging, also referred to herein as a BGP MVPN route "signaling storm," in the presence of a single link failure between VHO A2 and VHO A1, as is shown in FIG. 8. In the steady state configuration of FIG. 7, VHO A2 and VHO B2 represent respective next-hop network devices through which the VSOs can reach the multicast source 500. As soon as the link fails, VHO A2 will withdraw the BGP routes towards the multicast source 500. The VSOs will now have just one next-hop network device, namely VHO B2, through which the VSOs can reach the multicast source. Each VSO starts sending prune messages towards VHO A2 because that next-hop network device has lost its connectivity to the source. This results in withdrawal of 1.6 million routes from each of the route reflectors RR 1 and RR 2, and the corresponding excessive withdrawal messaging illustrated in FIG. 8. The 1.6 million routes withdrawn from a given route reflector in the present example comprise 2000 Type 6 routes and 2000 Type 7 routes for each of the VSOs, more particularly given by (2000*(Number of VSOs=400))+(2000*(Number of VSOs=400))=1.6M BGP routes.

This excessive withdrawal messaging is avoided in the present embodiment by configuring each of the VSOs to operate in the manner previously described in conjunction with FIGS. 2 and 3. Thus, each VSO in conjunction with originating an actual route to a given next-hop network device will also originate an empty route for that next-hop network device, and will generate only a single unreachability indicator message for the empty route for each of the route reflectors responsive to the failure in the actual route. Such an arrangement advantageously eliminates the BGP MVPN route signaling storm illustrated in FIG. 8, thereby permitting mass withdrawal of multiple routes and faster convergence in MVPNs.

More particularly, after the link failure shown in FIG. 8, each VSO will instead originate only a single unreachability indicator message for the empty route per route reflector. As a result, each route reflector will receive only 400 unreachability indicator messages responsive to the link failure, one from each of the 400 VSOs, instead of over one million unreachability indicator messages. It was indicated previously that such messages are considered examples of what are more generally referred to herein as "withdrawal messages." Other types of messaging can be used in other embodiments.

As mentioned above, embodiments of the present invention may be implemented in the form of articles of manufacture each comprising one or more software programs that are executed by processing circuitry of a network device or other processing device of a communication network.

Also, embodiments of the present invention may be implemented in one or more ASICS, FPGAs or other types of integrated circuit devices, in any combination. Such integrated circuit devices, as well as portions or combinations thereof, are examples of "circuitry" as that term is used herein.

A wide variety of other arrangements of hardware and associated software or firmware may be used in implementing embodiments of the invention.

Although certain illustrative embodiments are described herein in the context of particular communication protocols such as IP, BGP and MPLS, other types of networks can be used in other embodiments. The term "network" as used herein is therefore intended to be broadly construed.

It should again be emphasized that the embodiments described above are for purposes of illustration only, and should not be interpreted as limiting in any way. Other embodiments may use different types of network, device and module configurations, and alternative communication protocols and process steps for implementing withdrawal message control functionality based on empty routes. Also, it should be understood that the particular assumptions made in the context of describing the illustrative embodiments should not be construed as requirements of the invention. The invention can be implemented in other embodiments in which these particular assumptions do not apply. These and numerous other alternative embodiments within the scope of the appended claims will be readily apparent to those skilled in the art.

What is claimed is:

1. An apparatus comprising:
   a first network device comprising a processor coupled to a memory;
   the first network device being adapted for communication with one or more other network devices;
   the first network device being configured to originate an actual route by sending a multicast join message to a particular next-hop network device, and in conjunction with originating the actual route by sending the multicast join message to the next-hop network device, to generate an empty route associated with the next-hop network device for use in limiting a number of withdrawal messages that would otherwise result upon a failure in the actual route;
   wherein the actual route originated by sending the multicast join message to the next-hop network device is specified by a route distinguisher and at least one of a multicast source identifier and a multicast group identifier;
   wherein the empty route generated to limit the number of withdrawal messages is specified by a route distinguisher but does not include a multicast source identifier and does not include a multicast group identifier; and wherein the empty route is further specified by network layer reachability information (NLRI) that includes the route distinguisher of the empty route but does not incorporate any actual join or prune information.

2. The apparatus of claim 1 wherein sending the multicast join message comprises sending at least one of an (S,G) join message to originate a route of a first type and a (*,G) join message to originate a route of a second type, where S denotes a multicast source, G denotes a multicast group and * denotes an unspecified multicast source.

3. The apparatus of claim 2 wherein the first and second types of routes comprise respective Type 6 and Type 7 routes of a Protocol Independent Multicast (PIM).

4. The apparatus of claim 1 wherein the route distinguisher of the empty route corresponds to a route distinguisher (RD) of the next-hop network device.

5. The apparatus of claim 1 wherein the empty route represents a plurality of actual routes to the next-hop network device in that each of said plurality of actual routes includes the same route distinguisher as the empty route.

6. The apparatus of claim 1 wherein the empty route comprises an RD Join All route that represents a plurality of actual routes to the next-hop network device in that each of said plurality of actual routes includes the same route distinguisher as the empty route.

7. The apparatus of claim 6 wherein the RD Join All route is a Type 6 route that represents all Type 6 and Type 7 routes to the next-hop network device.

8. The apparatus of claim 1 wherein the first network device is further configured to generate an unreachability indicator message for the empty route indicating that the next-hop network device is unreachable responsive to the failure in the actual route.

9. The apparatus of claim 8 wherein the first network device is further configured to delete a plurality of actual routes to the next-hop network device that are represented by the empty route in conjunction with generation of the unreachability indicator message for the empty route, wherein said plurality of actual routes are represented by the empty route in that each of said plurality of actual routes includes the same route distinguisher as the empty route.

10. The apparatus of claim 8 wherein the unreachability indicator message for the empty route is sent to one or more additional network devices and further causes each of said one or more additional network devices to delete a plurality of actual routes to the next-hop network device that are represented by the empty route, wherein said plurality of actual routes are represented by the empty route in that each of said plurality of actual routes includes the same route distinguisher as the empty route.

11. The apparatus of claim 10 wherein receipt of the unreachability indicator message for the empty route by a given one of said one or more additional network devices prevents generation of withdrawal messages by the given additional network device for routes having the same route distinguisher as the empty route.

12. The apparatus of claim 10 wherein the actual routes that are deleted in response to receipt of the unreachability indicator message for the empty route include all routes having the same route distinguisher as the empty route in respective routing information bases of said one or more additional network devices.

13. The apparatus of claim 1 wherein the first network device comprises a video serving office of a Multicast Virtual Private Network (MVPN).

14. The apparatus of claim 13 wherein the video serving office generates only a single unreachability indicator message for the empty route for each of a plurality of route reflectors of the MVPN responsive to the failure in the actual route.

15. The apparatus of claim 1 wherein the NLRI for the empty route does not incorporate any actual (S,G) or (*,G) join or prune information.

16. The apparatus of claim 1 wherein the NLRI for the empty route further comprises, in addition to the route distinguisher of the empty route, a route type, a length and a source autonomous system.

17. A communication network comprising the apparatus of claim 1.

18. A method comprising:
originating in a first network device an actual route by sending a multicast join message to a particular next-hop network device; and
in conjunction with originating the actual route by sending the multicast join message to the next-hop network device, generating an empty route associated with the next-hop network device;
wherein the empty route is configured to limit a number of withdrawal messages that would otherwise result upon a failure in the actual route;
wherein the actual route originated by sending the multicast join message to the next-hop network device is specified by a route distinguisher and at least one of a multicast source identifier and a multicast group identifier;
wherein the empty route generated to limit the number of withdrawal messages is specified by a route distinguisher but does not include a multicast source identifier and does not include a multicast group identifier; and
wherein the empty route is further specified by network layer reachability information (NLRI) that includes the route distinguisher of the empty route but does not incorporate any actual join or prune information.

19. The method of claim 18 further comprising:
generating an unreachability indicator message for the empty route indicating that the next-hop network device is unreachable responsive to the failure in the actual route; and
sending the unreachability indicator message for the empty route to one or more additional network devices;
wherein the unreachability indicator message is configured to cause each of said one or more additional network devices to delete a plurality of actual routes to the next-hop network device that are represented by the empty route; and
wherein said plurality of actual routes are represented by the empty route in that each of said plurality of actual routes includes the same route distinguisher as the empty route.

20. An article of manufacture comprising a non-transitory processor-readable storage medium having embodied therein executable program code that when executed by a processor of the first network device causes the first network device:
to originate an actual route by sending a multicast join message to a particular next-hop network device; and in conjunction with originating the actual route by sending the multicast join message to the next-hop network device, to generate an empty route associated with the next-hop network device;

wherein the empty route is configured to limit a number of withdrawal messages that would otherwise result upon a failure in the actual route;

wherein the actual route originated by sending the multicast join message to the next-hop network device is specified by a route distinguisher and at least one of a multicast source identifier and a multicast group identifier;

wherein the empty route generated to limit the number of withdrawal messages is specified by a route distinguisher but does not include a multicast source identifier and does not include a multicast group identifier; and wherein the empty route is further specified by network layer reachability information (NLRI) that includes the route distinguisher of the empty route but does not incorporate any actual join or prune information.

\* \* \* \* \*